(12) United States Patent
Ho

(10) Patent No.: US 10,365,502 B2
(45) Date of Patent: Jul. 30, 2019

(54) PRESCRIPTION LENSES FOR SMART EYEWEAR

(71) Applicant: Patrick C. Ho, Hilton, NY (US)

(72) Inventor: Patrick C. Ho, Hilton, NY (US)

(73) Assignee: Patrick C Ho, Hilton, NY (US)

( * ) Notice: Subject to any disclaimer, the term of this patent is extended or adjusted under 35 U.S.C. 154(b) by 0 days.

(21) Appl. No.: 14/825,244

(22) Filed: Aug. 13, 2015

(65) Prior Publication Data

US 2016/0048038 A1  Feb. 18, 2016

Related U.S. Application Data

(60) Provisional application No. 62/036,780, filed on Aug. 13, 2014.

(51) Int. Cl.
G02C 7/02 (2006.01)
G02C 7/14 (2006.01)
G02C 7/06 (2006.01)
G02B 27/01 (2006.01)

(52) U.S. Cl.
CPC ......... G02C 7/022 (2013.01); G02B 27/0172 (2013.01); G02C 7/024 (2013.01); G02C 7/027 (2013.01); G02C 7/028 (2013.01); G02C 7/06 (2013.01); G02C 7/14 (2013.01); G02B 2027/011 (2013.01); G02B 2027/0178 (2013.01)

(58) Field of Classification Search
CPC . G02C 7/14; G02C 7/022; G02C 7/08; G02C 7/086; G02C 7/024; G02C 7/027; G02C 7/06; G02B 27/0172; G02B 2027/0178

USPC .......... 351/159.09, 159.16, 159.17
See application file for complete search history.

(56) References Cited

U.S. PATENT DOCUMENTS

| 5,305,028 A * | 4/1994 | Okano | G02C 7/06 |
| | | | 351/159.42 |
| 5,381,191 A * | 1/1995 | Levy | G02C 7/14 |
| | | | 351/159.58 |
| 5,452,030 A * | 9/1995 | Feinbloom | G02C 7/14 |
| | | | 351/159.58 |
| 2008/0137033 A1* | 6/2008 | Padula | G02C 7/14 |
| | | | 351/159.58 |
| 2010/0171922 A1 | 7/2010 | Sessner et al. | |
| 2013/0222757 A1* | 8/2013 | Klein | G02C 7/14 |
| | | | 351/111 |
| 2015/0219899 A1* | 8/2015 | Mack | G02B 27/0172 |
| | | | 345/633 |
| 2017/0108702 A1* | 4/2017 | Rabner | G02B 27/2242 |

FOREIGN PATENT DOCUMENTS

| EP | 2372431 A2 | 10/2011 |
| EP | 2605056 A1 | 6/2013 |
| WO | WO2015150401 A1 | 10/2015 |

* cited by examiner

*Primary Examiner* — Jordan M Schwartz
(74) *Attorney, Agent, or Firm* — Brown & Michaels, PC

(57) ABSTRACT

An eyeglass device configured for use with a smart eyewear near-to-eye display includes a pair of lenses having a prism which directs an eye's gaze of the wearer to a first power region to focus an image displayed by the near-to-eye display of the smart eyewear and a second power region to focus an image outside or beyond the near-to-eye display of the smart eyewear; and a method for optimizing the visual acuity of a wearer of smart eyewear when observing an image generated by a near-to-eye display and an image outside or beyond the near-to-eye displayed image.

12 Claims, 5 Drawing Sheets

PRESCRIPTION LENSES FOR SMART EYEWEAR

CROSS REFERENCE

This application claims the benefit of the filing date of U.S. Provisional Patent Application Ser. No. 62/036,780, filed Aug. 13, 2014, which is hereby incorporated by reference in its entirety.

FIELD

The present disclosure relates generally to a pair of prescription eyeglass lenses for use with smart eyewear, and more particularly to a pair of prescription eyeglass lenses used in conjunction with smart eyewear, eyeglasses containing such prescription lenses, and methods relating to improving visual acuity when using smart eyewear.

BACKGROUND

Current lens designs, conventional or digital, are primarily used for distance vision and for near vision in cases of multi-focal and progressive lenses. For lens intended to be used in conjunction with a visualization device which displays images in smart eyewear, the visualization element often displays the image in the central region of each lens. The location of displayed images from the visualization element, therefore, forces the wearer to look in a direction central to each lens to see the images generated. Moreover, when wearing smart eyewear, the wearer also needs to see their surroundings through the smart eyewear lens outside the perimeter of the displayed images. However, as the pupillary distance ("PD") varies between individuals, certain individuals may have pupils which lie outside the display image zone.

Normal prescription lenses are not designed to optimize the visual acuity of the image displayed in those very near gaze directions, particularly if the pupillary distance is outside the display image zone, which results in a blurring of the displayed image. Moreover, visual fatigue can occur as the eye tries to compensate for the movement to a less clear viewing area outside the displayed image.

Currently the only method to create prism in eyeglasses is a shifting of the entire lens. This would correct for the unwanted image displacement of the display, but would create unwanted image displacement when looking outside the area of the projected image.

Accordingly, there is a need for a lens designed for use in combination with a smart eyewear device that removes unwanted image displacement (unwanted prism) perceived by the wearer in the direction of sight associated with the device, providing the wearer a clear vision of the displayed images, as well as the normal clear vision their lenses provide of the world around them. The removal of unwanted prism and the enhancement of visual acuity reduce headaches, eye strain, and fatigue that may be caused by extended use of a smart eyewear display in combination with prescription glasses having typical prescription lenses. The art lacks an acceptable solution to these and other problems related to wearing smart eyewear.

SUMMARY

In accordance with an aspect of the present disclosure there is provided an eyeglass device configured for use with a smart eyewear near-to-eye display, the device including: a support member; a first lens supported by the support member, the first lens having a first focal point region, wherein the first focal point region has a first prism which directs a first eye's gaze of the wearer to a first power region of the first lens, wherein a power of the first power region is adjusted to a focal distance to focus an image displayed by a first near-to-eye display of the smart eyewear, and a second power region of the first lens, wherein a power of the second power region is adjusted to a focal distance to focus an image outside the first near-to-eye display of the smart eyewear; and a second lens supported by the support member, the second lens having a second focal point region, wherein the second focal point region has a second prism which directs a second eye's gaze of the wearer to a third power region of the second lens, wherein a power of the third power region is adjusted to a focal distance to focus an image displayed by a second near-to-eye display of the smart eyewear, and a fourth power region of the second lens, wherein a power of the fourth power region is adjusted to a focal distance to focus an image outside the second near-to-eye display of the smart eyewear.

In accordance with another aspect of the present disclosure there is provided a method for optimizing the visual acuity of a wearer of smart eyewear when observing an image generated by a near-to-eye display and an image outside the near-to-eye displayed image, including: providing an eyeglass device configured for use with a smart eyewear near-to-eye display, the device having a support member; a first lens supported by the support member, the first lens having a first focal point region, wherein the first focal point region has a first prism which directs a first eye's gaze of the wearer to a first power region of the first lens to focus an image displayed by a first near-to-eye display of the smart eyewear, and a second power region of the first lens to focus an image outside the first near-to-eye display of the smart eyewear; and a second lens supported by the support member, the second lens having a third focal point region, wherein the third focal point region has a second prism which directs a second eye's gaze of the wearer to a third power region of the second lens to focus an image displayed by a second near-to-eye display of the smart eyewear, and a fourth power region of the second lens to focus an image outside the second near-to-eye display of the smart eyewear; adjusting the power of the first power region to a focal distance to focus an image displayed by the first near-to-eye display of the smart eyewear; adjusting the power of the second power region to a focal distance to focus an image outside the first near-to-eye display of the smart eyewear; adjusting the power of the third power region to a focal distance to focus an image displayed by the second near-to-eye display of the smart eyewear; and adjusting the power of the fourth power region to a focal distance to focus an image outside the second near-to-eye display of the smart eyewear.

These and other aspects of the present disclosure are provided by methods and apparatuses for optimizing the visual acuity in the region of an eyeglass lens that is used to observe a smart eyewear near-to-eye display generated image.

BRIEF DESCRIPTION OF THE SEVERAL VIEWS OF THE DRAWING(S)

The present disclosure will be more fully understood and appreciated by reading the following Detailed Description in conjunction with the accompanying drawings, in which.

DETAILED DESCRIPTION

Figure 1:
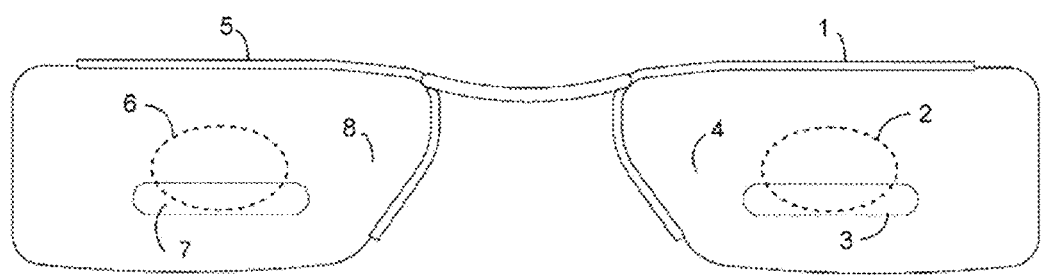
FIG. 1 is a back view illustrating an eyeglass device according to an embodiment of the present disclosure.
Figure 2:
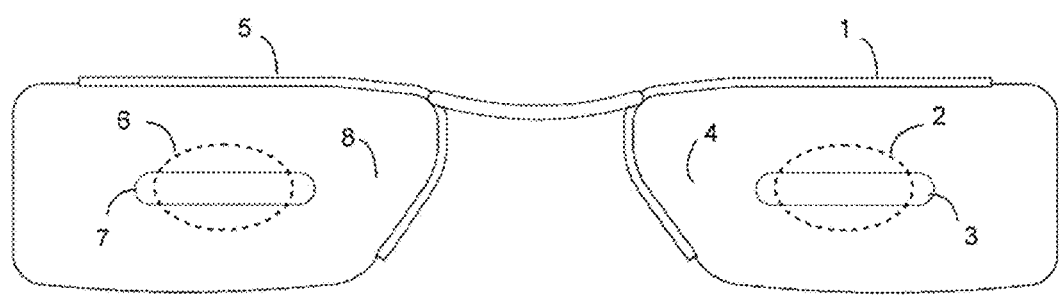
FIG. 2 is a back view illustrating an eyeglass device according to an embodiment of the present disclosure.
Figure 3:
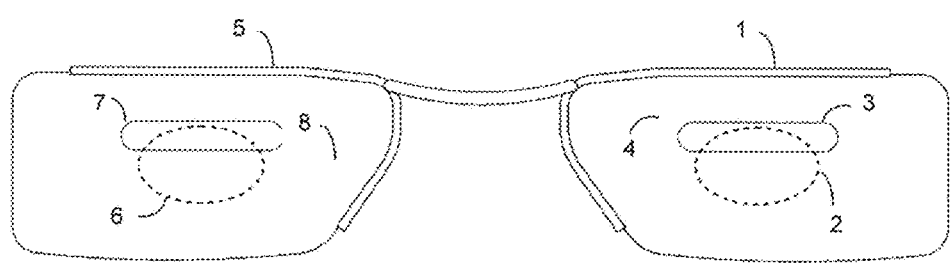
FIG. 3 is a back view illustrating an eyeglass device according to an embodiment of the present disclosure.
Figure 4:
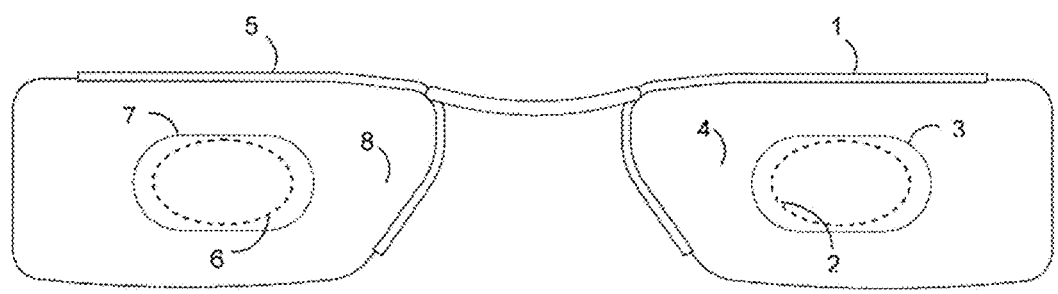
FIG. 4 is a back view illustrating an eyeglass device according to an embodiment of the present disclosure.

The present disclosure is directed to disclosure methods and apparatus relating to smart eyewear image-optimized prescription eyeglass lenses used in conjunction with a smart eyewear near-to-eye display and methods relating to improving visual acuity when using such display devices. Smart eyewear is defined as eyewear incorporating a near-to-eye display. As used herein, near-to-eye display means a display, device, or system, such as a retinal projector, virtual retinal display, visualization element, head-mounted display, heads-up display, or other near-to-eye system, typically worn on the head of a user that generates an image near the eye. In a smart eyewear configuration, a display device is often mounted adjacent to an edge of each of the wearer's eyes and an image is typically displayed in the center of each lens. The location of the displayed image, therefore, forces the wearer to gaze in a direction to view the image generated by the display. Typically positioned near the user's eye, the display is aligned to the central region of the user's field of view to allow review of the displayed information with little or no head movement. This enables the user to view the display while also viewing the area outside the central region and interacting with the surrounding environment. In another embodiment, the displayed image is aligned to a region other than the central region of the user's field of view.

In an embodiment, the smart eyewear image-optimized prescription eyeglass lenses of the present disclosure include a focal point region which encompasses the displayed image zone of each lens of the pair of lens members. The shape and location of this focal region depends at least in part on the location of the near-to-eye display, as well as the wearer's pupillary distance. For example, for a binocular display device located at least partially over both of the wearer's lenses, both the left lens and the right lens will include focal regions in the image display region of the lenses which is designed to provide visual acuity for viewing each image generated by the display device. For example, both the right lens and the left lens will include a focal region in the central portion of the lenses which is designed to optimize visual acuity for viewing the image generated by the display device located in both the left lens and the right lens. The wearer's PD is measured and a prism is incorporated in the lens design to shift the focal point of the eye's gaze to the center of the displayed image. The prism can take any shape or configuration and can be located at any position of the lens. The power of the lens in the non-prism portion is dependent upon the wearer's prescription and is designed to optimize visual acuity for viewing images outside or beyond the image generated by the display device.

An eyeglass device in accordance with an embodiment of the present disclosure is configured for use with a smart eyewear near-to-eye display. The device includes a support member for supporting a pair of lenses. Each lens has a focal point region, wherein the focal point region includes a prism which directs the eye's gaze of the wearer to a first power region of the lens. The power of the first power region is adjusted to a focal distance to focus an image displayed by the near-to-eye display of the smart eyewear. The power of the second power region is adjusted to a focal distance to focus an image outside or beyond the near-to-eye display of the smart eyewear.

The prism directs the eye's gaze towards the displayed image. The prescription allows the wearer to see the displayed image and the surroundings clearly.

An embodiment relates to a method for optimizing the visual acuity of a wearer of smart eyewear when observing an image generated by a near-to-eye display and an image outside or beyond the near-to-eye displayed image. The method includes providing an eyeglass device configured for use with the smart eyewear, providing the lens with a prism in the focal point region, wherein the prism in the focal point region directs the eye's gaze of the wearer to a power region of the lens. The power of the power region is adjusted to a focal distance to focus the image displayed by the near-to-eye display of the smart eyewear. The power of a power region outside the displayed image zone is adjusted to a focal distance to focus an image outside the near-to-eye display of the smart eyewear.

Referring now to the drawings, wherein like reference numerals refer to like parts throughout, shown in FIGS. 1-4, is a back view illustrating an eyeglass device according to an embodiment of the present disclosure. The lens support includes right lens 1 (first lens) and left lens 5 (second lens). A projected image 2 of the right lens 1 (first lens) and a projected image 6 (dotted oval) of the left lens 5 (second lens) are each generated by a near-to-eye display of the smart eyewear. Each of an area of potential prismatic compensation 3 (first focal point region, solid oval) in the right lens 1 (first lens) and an area of potential prismatic compensation 7 (second focal point region, solid oval) in the left lens 5 (second lens) includes a prism designed to adjust the sight center line of the wearer to the image center line of the smart eyewear. A distance viewing area 4 (second power region) of the right lens 1 (first lens) and a distance viewing area 8 (fourth power region) of the left lens 5 (second lens) occupy the remainder of the lens area of the right lens 1 (first lens) and the left lens 5 (second lens), respectively.

As illustrated in FIGS. 1-4, the location of the area of potential prismatic compensation 3 (first focal point region, solid oval) in the right lens 1 (first lens) and the area of potential prismatic compensation 7 (second focal point region, solid oval) in the left lens 5 (second lens) can overlap and occupy various portions of the projected image.

Figure 5:
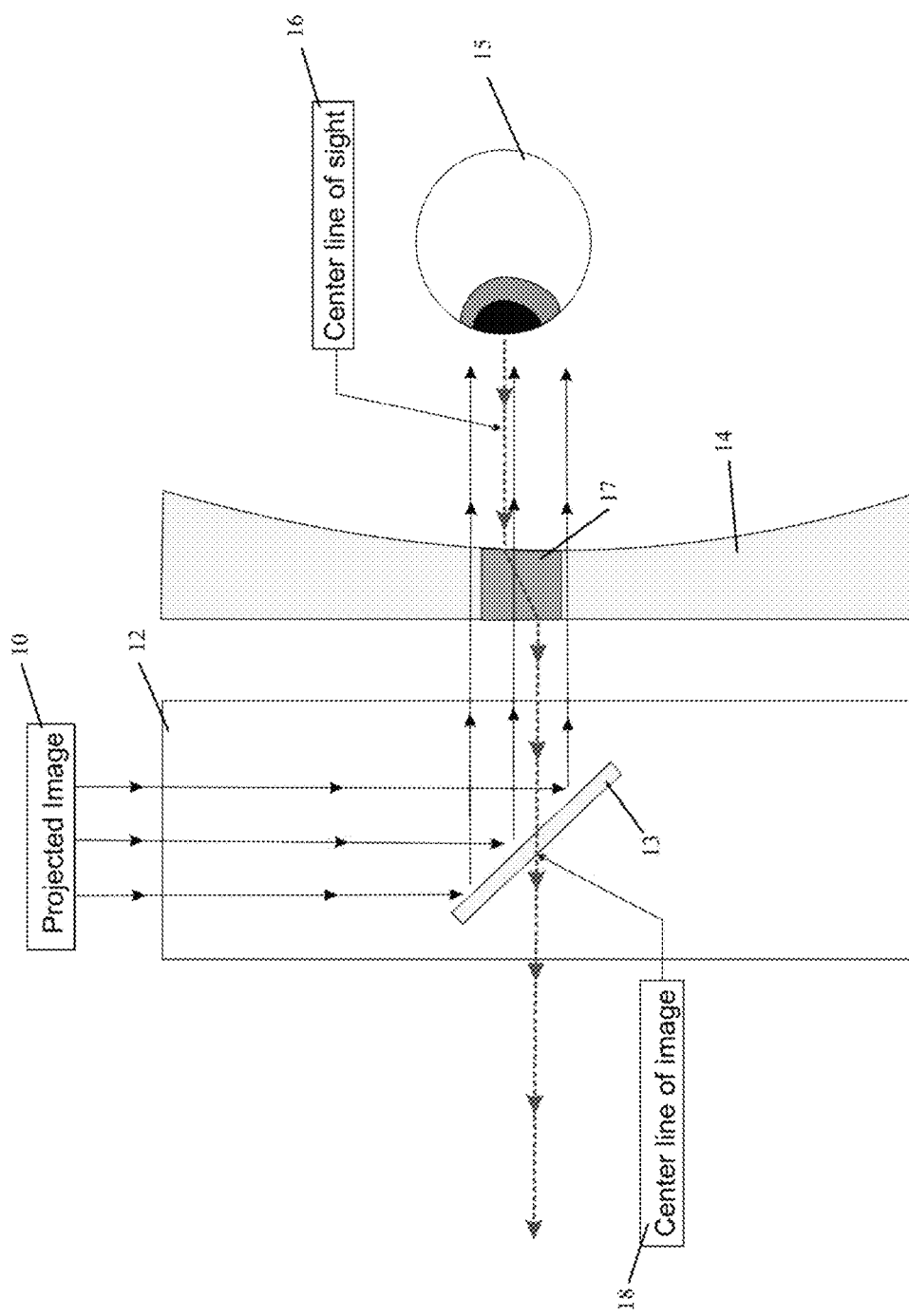
FIG. 5 is a cross sectional schematic view illustrating the operation of an eyeglass device in combination with smart glasses, according to an embodiment of the present disclosure.

As shown in FIG. 5, a schematic cross-sectional view illustrates the operation of an eyeglass device in combination with smart eyewear according to an embodiment of the present disclosure. A projected image 10 is generated by a near-to-eye display onto a mirror lens 13 of the smart eyewear 12. The mirror lens 13 reflects the projected image 10 through a lens 14 of the eyeglass device to an eye 15 of the wearer. A sight center line 16 of the wearer's eye 15 is aligned by a prism area 17 of the lens 14 to an image center line 18 in the mirror lens 13. The prism is designed to adjust the center line of sight to the left or right to match the center line of the displayed image based upon the wearer's PD. The prism is designed to adjust the center line of sight up or down to match the center line of the displayed image based upon the wearer's optical center height ("OC"). Thus, the focal point of the wearer is adjusted by placing the designed prism within the lens to align the center line of sight to the center line of the displayed image. Independent from the focal point adjustment, the power can be adjusted based upon the wearer's prescription to allow the wearer to see the displayed image clearly. Independent from the focal point adjustment and the power adjustment within the displayed image zone, the power can be adjusted based upon the wearer's prescription to allow the wearer to see outside or beyond the displayed image.

In addition to lenses designed or created specifically for the lens carrier, the lens may be manufactured from any material that is or can be utilized in traditional eyeglasses. The lens may also be a tinted lens, such as a sunlight filtering or blocking lens. The lens can be treated with any known coating or strengthening method, including anti-glare and anti-scratch treatment. In some embodiments, the lens can be one or more of the above.

The lens can be any shape that is or can be utilized in eyeglasses. For example, the lens can be rounded, square, oval, rectangular, or any of a variety of other shapes. Although the lens is illustrated in the figures primarily as rectangular with rounded corners, it should be understood that the lenses are not in any way limited to this shape.

The lenses can be installed in one or more support members designed to hold the lenses in place, such as eye wires or rims that partially or completely encircle the lenses. For example, as shown in FIGS. 1-4, each rim partially encircles each lens. The rim firmly holds lens in place, but can be designed to allow the lenses to be interchangeable or replaced.

According to an embodiment, the rims are joined by a bridge. Among other functions, the bridge adds support and strength to the lens carrier. The bridge can be situated at any location along the eye rims. According to one embodiment, the bridge is as thick as the rims and thus is flush with the rims in the front and back. According to another embodiment, the bridge is not as thick as the rims.

In an embodiment, each of lens members includes a focal point region in a central portion of the lens, as shown in FIGS. 1-4. The specific shape and location of this focal region will depend at least in part on the location of the near-to-eye device, the location of the generated image, as well as the wearer's PD, among other factors. In accordance with the present disclosure, the location of the focal region can be at any position about the perimeter of the lens. Similarly, for a binocular near-to-eye device located at least partially over both of the wearer's lenses, both the left lens and the right lens will include a focal region in the display region of the lenses, as shown in FIGS. 1-4, which is designed to optimize visual acuity for the displayed image. The size and shape of the focus region can vary considerably.

According to an embodiment, the focal point region in the lenses contains a prism designed to alter the direction of sight toward the visualization element and image generated thereby to correct for poor placement of the displayed image caused by mismatch of pupillary distance of the left eye and the right eye. The power of this region can be independently adjusted to allow the wearer to see the displayed image clearly.

The remainder of lenses, however, can be similar or identical to the prescription normally utilized by the wearer to obtain visual acuity in the surroundings outside or beyond the displayed image zone. The lenses can be progressive lenses to provide a smooth transition between regions.

According to an embodiment, the shape, size, and/or positioning of the focal point region in the lenses is variable, and is dependent at least in part on the wearer's PD. For example, if the wearer has a wide PD, then the size of focal region may be smaller to avoid unwanted overlap with the wearer's pupil. For wearers with a narrower PD, the size of focal region may be bigger.

According to an embodiment, the power of focal point region is based at least in part on the wearer's individual prescription, in addition to the wearer's PD, the user's optical defects such as astigmatism, and/or axis of the cylindrical power. Very near vision is closer to the pupil than typical near vision, which is used to view cell phones, books, newspapers and the like. The gaze of the eyes outside or beyond the displayed image is not the same as the focal point of the eyes when viewing the image generated by the near-to-eye device. In accordance with the present disclosure, the power of the focal point region is optimized to allow the eyes to have the same focal distance when viewing the image generated by the device. Such optimization of the power of the focal region provides enhanced visual acuity of the generated image. Further, optimization of the power of the focal region can prevent eye strain, fatigue and headaches that may be caused by prolonged use of the near-to-eye device in combination with typical prescription lenses. Thus, the present disclosure provides a method and device for optimization of lens design when the eyes are focused on a very near object and when they are not. Additionally, the power of focal region may be adjusted to account for a visual acuity outside or beyond the image generated by the device. Accordingly, the wearer can see the image generated by the device while having optimized vision when looking straight ahead and/or for near vision. Moreover, the power of the focal region may be the same or different for each lens in the lens pair. The production of optimized lenses in accordance with the present disclosure can be provided by processes know in the art, such as be digital lens generators, and the like.

According to another embodiment, focal point region can be configured to account for the size, shape, and construction of the displayed image.

Although the present disclosure has been described in connection with various embodiments, it should be understood that modifications, alterations, and additions can be made to the disclosure without departing from the scope of the disclosure as defined by the claims.

What is claimed is:

1. An eyeglass device configured for use with smart eyewear, the smart eyewear having near-to-eye displays, the device comprising:
   a support member;
   a first lens supported by the support member, the first lens comprising a first focal point region, wherein the first focal point region comprises a first prism which is a first power region and which is configured to displace a first center line of sight between a first eye of the wearer and the first prism of a first eye's gaze of the wearer through the first lens to an optical path parallel to the first center line of sight and collinear to a center line of a first near-to-eye displayed image when the first lens is positioned between the first eye and the displayed image, wherein a power of the first power region is adjusted to a first focal distance to focus the first near-to-eye displayed image, the first lens further comprising a second power region, wherein a power of the second power region is adjusted to a second focal distance to focus an image outside and beyond the first near-to-eye displayed image; and a second lens supported by the support member, the second lens comprising a second focal point region, wherein the second focal point region comprises a second prism which is a third power region and which is configured to displace a second center line of sight between a second eye of the wearer and the second prism of a second eye's gaze of the wearer through the second lens to an optical path parallel to the second center line of sight and collinear to a center line of a second near-to-eye displayed image when the second lens is positioned between the second eye and the displayed image, wherein a power of the third power region is adjusted to a third focal distance to focus the second near-to-eye displayed image, the second lens further comprising a fourth power region, wherein a power of the fourth power region is adjusted to a fourth focal distance to focus an image outside and beyond the second near-to-eye displayed image.

2. The device of claim 1, wherein the power of the first, second, third, and fourth power regions is determined at least in part based upon the wearer's prescription.

3. The device of claim 1, wherein the location of the first and second prisms is dependent at least in part on the wearer's pupillary distance.

4. The device of claim 1, wherein the location of the first and second prisms is dependent at least in part on the wearer's optical center height.

5. A method for optimizing the visual acuity of a wearer of smart eyewear when observing the images generated by near-to-eye displays and real world objects outside the displayed images, comprising:
  providing an eyeglass device configured for use with a smart eyewear near-to-eye display, the device comprising:
    a support member; a first lens supported by the support member, the first lens comprising a first focal point region, wherein the first focal point region comprises a first prism which is a first power region and which is configured to displace a first center line of sight between a first eye of the wearer and the first prism of a first eye's gaze of the wearer through the first lens to an optical path parallel to the first center line of sight and collinear to a center line of a first near-to-eye displayed image when the first lens is positioned between the first eye and the displayed image, the first lens further comprising a second power region adapted to focus an image outside and beyond the first near-to-eye displayed image; and
    a second lens supported by the support member, the second lens comprising a second focal point region, wherein the second focal point region comprises a second prism which is a third power region and which is configured to displace a second center line of sight between a second eye of the wearer and the second prism of sight of a second eye's gaze of the wearer through the second lens to an optical path parallel to the second center line of sight and collinear to a center line of an image displayed by a second near-to-eye displayed image when the second lens is positioned between the second eye and the displayed image, the second lens further comprising a fourth power region adapted to focus an image outside and beyond the second near-to-eye displayed image;
  adjusting the power of the first power region to a focal distance to focus the first near-to-eye displayed image;
  adjusting the power of the second power region to a focal distance to focus an image outside or beyond the first near-to-eye displayed image;
  adjusting the power of the third power region to a focal distance to focus the second near-to-eye displayed image; and
  adjusting the power of the fourth power region to a focal distance to focus an image outside or beyond the second near-to-eye displayed image; and
  placing the device between the displayed images and the eyes of the wearer.

6. The method of claim 5, wherein the power of the first, second, third, and fourth power regions is determined at least in part based upon a prescription of the wearer.

7. The method of claim 6, wherein the location of the first and second prisms is dependent at least in part on a pupillary distance of the wearer.

8. The method of claim 5, wherein the location of the first and second prisms is dependent at least in part on an optical center height of the wearer.

9. An eyeglass device configured for use with smart eyewear, the smart eyewear having one or more near-to-eye displays, the device comprising:
  a support member; and
  a first lens supported by the support member, the first lens comprising a first focal point region, wherein the first focal point region comprises a first prism which is a first power region and which is configured to displace a first center line of sight between a first eye of the wearer and the first prism of a first eye's gaze of the wearer through the first lens to an optical path parallel to the first center line of sight and collinear to a center line of a first near-to-eye displayed image when the first lens is positioned between the first eye and the displayed image, wherein a first power of the first power region is adjusted to a first focal distance to focus the first near-to-eye displayed image, the first lens further comprising a second power region, wherein a second power of the second power region is adjusted to a second focal distance to focus an image outside or beyond the first near-to-eye displayed image.

10. The device of claim 1, wherein the second power region encompasses a circumference of the first focal point region.

11. The device of claim 1, wherein the first power region is configured to focus only the first near-to-eye displayed image.

12. An eyeglass device comprising:
  a first near-to-eye display, the first near-to-eye display producing a first image including a center line; and
  eyeglasses including:
    a support member; and
    a first lens supported by the support member, the first lens comprising a first focal point region, wherein the first focal point region comprises a first prism which is a first power region and which is configured to direct a center line of sight of a first eye's gaze of the wearer through the first lens to the center line of the first image, wherein a power of the first power region is adjusted to a first focal distance to focus the first image, the first lens further comprising a second power region, wherein a power of the second power region is adjusted to a second focal distance to focus a second image outside or beyond the first image.

* * * * *